Patented Feb. 14, 1939

2,147,315

UNITED STATES PATENT OFFICE 2,147,315

LUBRICANT COMPOSITION AND METHOD OF PREPARING THE SAME

Mathias Pier, Heidelberg, and Friedrich Christmann, Ludwigshafen-on-the-Rhine, Germany, assignors to I. G. Farbenindustrie Aktiengesellschaft, Frankfort-on-the-Main, Germany No Drawing. Application March 1, 1934, Serial No. 713,601. In Germany March 8, 1933

11 Claims. (Cl. 87—9)

The present invention relates to the production of substances which are valuable lubricants or which constitute valuable improving agents for lubricants, and to compositions containing such substances.

We have proposed elsewhere a process for the manufacture and production of lubricating oils or improving agents for lubricants from initial materials containing hydrocarbons which are unsuitable for lubricating purposes, by halogenation and subsequent condensation in the presence of catalysts, the initial materials consisting of hydrocarbons of high molecular weight which are wholly or mainly composed of hard or soft paraffin wax.

We have now found that valuable lubricating oils or products similar to lubricating oils and suitable for improving lubricants are obtained by starting from aliphatic alcohols of high molecular weight, i. e. aliphatic hydrocarbon derivatives containing at least one hydroxyl group, in particular those containing at least 12 carbon atoms in the molecule, and by replacing at least one hydroxyl group by halogen, most suitably chlorine, and subjecting the resulting products to condensation or polymerization.

As initial materials for the preparation of the condensation products, monohydric or polyhydric alcohols of high molecular weight, as for example stearyl alcohol, oleyl alcohol, cetyl alcohol, lauryl alcohol, myricyl alcohol, stearylene glycol or high molecular esters or ethers still containing free hydroxyl groups, such as ethylene glycol monostearyl ether, may be employed.

Prior to the condensation, the alcohols are treated with agents capable of exchanging hydroxyl groups in organic compounds by halogen, in particular reactive chlorides, such as thionyl chloride, phosgene, sulphuryl chloride, phosphorus oxychloride, phosphorus trichloride or phosphorus pentachloride, or hydrochloric acid, if desired in the presence of agents for removing water, such as zinc chloride and phosphorus pentoxide; the hydroxyl groups are thus replaced by halogen. The resulting halogenation products are then condensed in the presence of condensing agents of the Friedel-Crafts type, as for example aluminium chloride.

The condensation may be carried out in the presence of other organic substances, in particular hydrocarbon products, such as tars, mineral oils, their distillation, extraction and cracking products, or products from the destructive hydrogenation of carbonaceous materials. It is advantageous to condense the alcohols and the like together with cyclic, preferably aromatic hydrocarbons. As the latter may be mentioned especially naphthalene or mineral coal tar fractions, such as crude benzol, middle oil and anthracene oil as well as other products of an aromatic nature, as for example those obtained by destructive hydrogenation at elevated temperatures above 500° C. (so-called "aromatization") or dehydrogenation. Gaseous or vaporous olefines, such as ethylene, propylene and butylene, also in the form of cracking gases, and even liquid olefines obtainable from paraffinic hydrocarbons, as for example by cracking, may also be brought into reaction during the condensation.

By adding the resulting condensation products to lubricating oils and the like, not only is the setting point of the oils, lubricating greases or the like, lowered, but the temperature-viscosity curve is improved at the same time.

The amount of the products thus obtained to be added to the oils and the like to lower the setting point or improve the temperature-viscosity curve may vary within wide limits, as for example between 0.1 and 10 per cent or more. Even lubricating oils, gear oils or gear greases having very high setting points may be very considerably improved by the addition of the said condensation products.

The following example will further illustrate the nature of this invention but the invention is not restricted to this example. The parts are by weight.

Example

Oleyl alcohol is converted into the corresponding chlorinated hydrocarbon by treatment with thionyl chloride at 80° C. 100 parts of the product are diluted with 100 parts of light petroleum (specific gravity 0.780). The mixture is condensed during the course of 18 hours at from 30° to 80° C. with an addition of 12 parts of naphthalene, 5 parts of zinc oxide and 7 parts of aluminium chloride. The condensation product is freed from solid constituents of the reaction mixture by centrifuging, and refined with 2 per cent of bleaching earth at from 250° to 280° C., the light petroleum added as a diluent being thus partly distilled over. After filtering off the bleaching earth residue and subjecting to steam distillation in vacuo, about 50 parts of light lubricating oil and about 40 parts of a cylinder oil having a viscosity of 10° Engler at 100° C. are obtained. If this be added in an amount of about 1 per cent to a German machine oil having a setting point of zero C, the setting point of the oil is lowered to about 20° below zero C.

What we claim is:—

1. The process of producing lubricants which comprises acting on an aliphatic alcohol having at least 12 carbon atoms in the molecule with a halogenating agent capable of exchanging a hydroxyl group by a halogen atom and acting on the resulting product with a condensing agent of the Friedel-Crafts type at a condensing temperature.

2. The process of producing lubricants which comprises acting on an aliphatic alcohol having at least 12 carbon atoms in the molecule with a halogenating agent capable of exchanging a hydroxyl group by a halogen atom and acting on the resulting product in the presence of an aromatic hydrocarbon with a condensing agent of the Friedel-Crafts type at a condensing temperature.

3. The process of producing lubricants which comprises acting on an aliphatic alcohol having at least 12 carbon atoms in the molecule with a halogenating agent capable of exchanging a hydroxyl group by a halogen atom and acting on the resulting product in the presence of an aromatic hydrocarbon with a condensing agent of the Friedel-Crafts type at a condensing temperature.

4. The process of producing lubricants which comprises acting on an aliphatic alcohol having at least 12 carbon atoms in the molecule with a halogenating agent capable of exchanging a hydroxyl group by a halogen atom and acting on the resulting product in the presence of an olefine with a condensing agent of the Friedel-Crafts type at a condensing temperature.

5. The process of producing lubricants which comprises acting on oleyl alcohol with a halogenating agent capable of exchanging a hydroxyl group by a halogen atom and acting on the resulting product with a condensing agent of the Friedel-Crafts type at a condensing temperature.

6. The process of producing lubricants which comprises acting on oleyl alcohol with a halogenating agent capable of exchanging a hydroxyl group by a halogen atom and acting on the resulting product with aluminium chloride at a condensing temperature.

7. The process of producing lubricants which comprises acting on oleyl alcohol with thionyl chloride and acting on the resulting product with aluminium chloride at a condensing temperature.

8. The process of producing lubricants which comprises acting on oleyl alcohol with thionyl chloride and acting on the resulting product in the presence of an aromatic hydrocarbon with aluminium chloride at a condensing temperature.

9. The process of producing lubricants which comprises acting on oleyl alcohol with thionyl chloride and acting on the resulting product in the presence of naphthalene with aluminium chloride at a condensing temperature.

10. An improved fluid lubricant consisting substantially of a major portion of viscous mineral oil containing waxy material in quantity sufficient to affect substantially the pour point of the oil, and a minor portion of the condensation product of naphthalene and oleyl alcohol, sufficient to lower substantially the pour point of the oil.

11. Process for producing a lubricant comprising treating an aliphatic alcohol containing a chain of at least 12 carbon atoms with a halogenating reagent capable of substituting the halogen atom for the hydroxyl group of the said alcohol, and treating the resulting compound with a Friedel-Crafts condensing agent in the presence of an aromatic hydrocarbon whereby a condensation product of the aliphatic compound and the compound containing the carbon ring is effected.

MATHIAS PIER.
FRIEDRICH CHRISTMANN.